United States Patent [19]

Ishida et al.

[11] 4,388,256
[45] Jun. 14, 1983

[54] PROCESS FOR MANUFACTURING REGENERATED CELLULOSE HOLLOW FIBER

[76] Inventors: Masamichi Ishida, 2-19, Nishisakae, Otake-shi, Hiroshima-ken; Jun Kamo, 3-2-1, Kurokawa, Otake-shi, Hiroshima-ken; Toru Takemura, 3-2-303, Kurokawa 3-chome; Shunsuke Minami, 3-2-104, Kurokawa 3-chome, both of Otake-shi, Hiroshima-ken; Kensuke Kamada, 44-20, Hanazono-cho, Chiba-shi, Chiba-ken, all of Japan

[21] Appl. No.: 70,651

[22] Filed: Aug. 28, 1979

[30] Foreign Application Priority Data

Nov. 24, 1978 [JP] Japan ................................ 53/145185
Dec. 14, 1978 [JP] Japan ................................ 53/157000

[51] Int. Cl.³ ............................................. B29D 27/00
[52] U.S. Cl. .................................... 264/41; 210/500.2; 264/209.3; 264/210.8; 264/561; 428/398
[58] Field of Search ................. 264/177 F, 561, 210.8, 264/209.3; 210/500.2; 428/398

[56] References Cited

U.S. PATENT DOCUMENTS

| 3,423,491 | 1/1969 | McLain et al. ...................... 264/49 |
| 3,546,209 | 12/1970 | Lipps ................................... 210/321 |
| 3,724,672 | 4/1973 | Leonard et al. ..................... 264/200 |
| 3,888,771 | 6/1975 | Isuge et al. ........................ 210/500.2 |
| 4,035,459 | 7/1977 | Kesting ............................... 264/184 |
| 4,127,625 | 11/1978 | Arisaka et al. ................... 264/177 F |
| 4,219,517 | 8/1980 | Kesting ............................. 210/500.2 |

FOREIGN PATENT DOCUMENTS

| 1047412 | 1/1979 | Canada . |
| 2103343 | 4/1972 | France . |
| 2194551 | 3/1974 | France . |
| 2300606 | 9/1976 | France . |
| 2309585 | 11/1976 | France . |
| 49-64573 | 6/1974 | Japan .............................. 264/177 F |
| 50-70611 | 6/1975 | Japan . |
| 51-49013 | 12/1976 | Japan . |
| 52-85525 | 7/1977 | Japan . |
| 4714416 | 12/1977 | Japan . |
| 53-6627 | 6/1978 | Japan . |
| 53-70128 | 6/1978 | Japan . |
| 54-15030 | 2/1979 | Japan . |
| 54-42419 | 4/1979 | Japan . |
| 54-116422 | 9/1979 | Japan . |
| 54-138615 | 10/1979 | Japan . |
| 54-138616 | 10/1979 | Japan . |
| 54-151614 | 11/1979 | Japan . |
| 54-151615 | 11/1979 | Japan . |
| 54-151616 | 11/1979 | Japan . |
| 1071909 | 6/1967 | United Kingdom . |
| 1481064 | 7/1977 | United Kingdom . |

OTHER PUBLICATIONS

Text Res. J., vol. 19, No. 7, pp. 381–392, 7-1949.

*Primary Examiner*—Jay H. Woo
*Attorney, Agent, or Firm*—Oblon, Fisher, Spivak, McClelland & Maier

[57] ABSTRACT

A regenerated cellulose hollow fiber exhibiting a good cellulose II crystalline structure and an exchanged wet strength/wet elongation ratio is prepared by a process wherein: a dope comprised of cellulose ester in a nonvolatile organic solvent is extruded through a circular slit defined between inner and outer tubes of a spinning nozzle having a double tube structure, while a core liquid is forced through the inner tube of said nozzle; the hollow fibrous extrudate is coagulated in a coagulating bath; the coagulated hollow fibrous extrudate is drawn 1.05 to 2.00 times its original length; and then, the drawn hollow fiber still containing a core liquid in the hollow is treated with an aqueous caustic alkali solution containing at least 0.5% by weight of a water soluble metal salt, thereby hydrolyzing the cellulose ester into cellulose.

12 Claims, 3 Drawing Figures

PROCESS FOR MANUFACTURING REGENERATED CELLULOSE HOLLOW FIBER

BACKGROUND OF THE INVENTION (1) Field of the Invention

This invention relates to a regenerated cellulose hollow fiber used as a permeable membrane for dialysis and ultrafiltration and to a process for producing the same.

(2) Description of the Prior Art

In recent years regenerated cellulose hollow fibers have been popularly used as dialysis membrane such as a blood dialyzer, i.e., an artificial kidney. The following properties are desired for regenerated cellulose hollow fibers: (1) balanced water permeability and dialysis performances, (2) perfectly circular hollow cross-section, (3) feedom from pinholes and other imperfections, (4) enhanced wet strength and dimensional stability, and (5) no toxicity hazard. Regenerated cellulose hollow fibers possessing all of such desired properties are not yet known.

U.S. Pat. No. 3,888,771 discloses a regenerated cellulose hollow fiber produced from a cuprammonium cellulose solution. This regenerated cellulose hollow fiber is commercially available but not completely satisfactory in the handling characteristics. This is because its degree of crystallite orientation and wet strength/wet elongation ratio are as low as only approximately 75% and approximately 1.1 g/d, respectively. Furthermore, the regenerated cellulose hollow fiber is not always sanitarily safe because it is possible that a trace amount of copper remains in the wall thickness of the hollow fiber.

U.S. Pat. No. 3,546,209 discloses a process for preparing a regenerated cellulose hollow fiber from a cellulose ester wherein the cellulose ester combined with a plasticizer is melt extruded into a cellulose ester hollow fiber which is then hydrolyzed into a regenerated cellulose hollow fiber. The regenerated cellulose hollow fiber prepared by this process is not completely satisfactory in its handling characteristics because the hollow fiber possesses a low wet strength and, when it is reinstated from a dry state to a wet state, exhibits a large elongation. Furthermore, the regenerated cellulose hollow fiber is liable to be distorted from its circular cross-section in the melt extruding and hydrolyzing steps.

SUMMARY OF THE INVENTION

The main object of the present invention is to provide a regenerated cellulose hollow fiber characterized as being completely free from toxicity hazards and possessing improved mechanical strength and handling characteristics.

Other objects and advantages of the present invention will be apparent from the following description.

In one aspect of the present invention there is provided a regenerated cellulose membrane in the form of a hollow fiber prepared by hydrolyzing a cellulose ester hollow fiber, said membrane being characterized as (a) containing a cellulose II crystal structure at a degree of crystallinity of from 40 to 75%, said cellulose II crystal structure having a degree of crystallite orientation of from 78 to 90% and having a crystallite size of from 60 to 150 angstroms as measured along the fiber axis, and (d) exhibiting a wet strength/wet elongation ratio of from 1.50 to 8.0 g/d.

In another aspect of the present invention there is provided a process for producing a regenerated cellulose membrane in the form of a hollow fiber, which comprises the steps of:

extruding a dope comprised of cellulose ester in a non-volatile organic solvent through a circular slit defined between inner and outer tubes of a spinning nozzle having a double tube structure, while a core liquid is forced through the inner tube of said nozzle;

coagulating the hollow fibrous extrudate in a coagulating bath;

drawing the coagulated hollow fibrous extrudate 1.05 to 2.00 times its original length; and then, treating the drawn hollow fiber still containing a core liquid in the hollow, with an aqueous caustic alkali solution containing at least 0.5% by weight of a water soluble metal salt, thereby hydrolyzing the cellulose ester into celulose.

DETAILED DESCRIPTION OF THE INVENTION

Figure 1A:
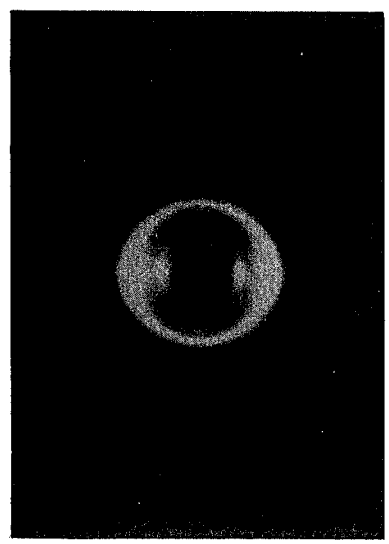
FIG. 1A is an X-ray diffraction photograph of one example of the regenerated cellulose fibers of the present invention.

The burst strength (Pe) of a hollow fiber is generally represented by the formula (1):

$$Pe = \frac{2E}{(1-\nu^2)} \cdot \left(\frac{t}{OD}\right)^3 \qquad (1)$$

wherein
$\nu$ = Poisson's ratio,
E = Young's modulus,
t = wall thickness of the hollow fiber, and
OD = outer diameter of the hollow fiber.

It will be apparent from the above formula (1) that the smaller the outer diameter of the hollow fiber, the larger the burst strength, and further that the larger the wall thickness of the hollow fiber, the larger the burst strength. It is said, however, that the minimum practically permissible outer diameter of a hollow fiber is approximately 100 microns particularly in view of blood dialysis, and the wall thickness of the hollow fiber should preferably be as small as possible from a viewpoint of dialysis and ultrafiltration performances. Thus, it is advantageous to enhance the burst strength of a hollow fiber by increasing Young's modulus of the hollow fiber.

The buckling load (Pk), i.e., the minimum load under which the hollow fiber buckles, is represented by the formula (2) provided that the cross-section of the hollow fiber is completely circular.

$$Pk = \frac{4\pi^2 E\, Iz}{l^2}, \quad Iz = \frac{\pi}{64}(d_2^4 - d_1^4) \qquad (2)$$

wherein
E = Young's modulus, l = length of the hollow fiber,
d₁ = inner diameter of the hollow fiber, and
d₂ = outer diameter of the hollow fiber.

The formula (2) means that the larger the Young's modulus and the wall thickness of hollow fiber (i.e., the difference between the outer and inner diameter), the larger the buckling load (Pk). The larger the burst strength and the buckling load, the better the handling characteristics of the hollow fiber and the dimensional stability thereof.

It has been found that the stress-strain curve of a wet regenerated cellulose hollow fiber satisfies the formula (3).

$$\theta = E \cdot x \quad (3)$$

where is stress, x strain and E Young's modulus. Thus, the Young's modulus of a wet regenerated cellulose hollow fiber can be represented approximately by the ratio of the stress at break to the elongation at break.

The hollow fiber of the present invention is characterized as exhibiting a Young's modulus approximately twice or more of those of conventional regenerated cellulose fibers; that is, exhibiting a wet strength/wet elongation ratio of from 1.50 to 8.0 g/d. Thus, the hollow fiber of the present invention exhibits enhanced handling characteristics and dimensional stability. By the term "wet strength/wet elongation ratio" herein used is meant the proportion defined by the following equation:

"wet strength/wet elongation ratio" =

$$\frac{\text{wet strength at break in gram/denier (g/d)}}{\text{wet elongation at break in \%}} \times 100 \text{ (g/d)}$$

This ratio is determined by drawing a tensile strength-elongation curve from the data obtained by using a tensile tester, and calculating the ratio from the wet strength at break and the wet elongation at break.

When the wet strength/wet elongation ratio is lower than 1.50 g/d, the handling characteristics of the hollow fiber are not satisfactory, particularly it becomes difficult to fabricate the hollow fibers into a module without any damage and the handling characteristics of the module becomes poor. In contrast, when the wet strength/wet elongation ratio exceeds 8.0 g/d, the dialysis performance becomes poor. The wet strength/wet elongation ratio is preferably in the range of from 2.0 and 5.0 g/d.

The regenerated cellulose hollow fiber of the present invention is predominantly comprised of a cellulose II crystal structure. In general, the lower the degree of crystallinity of the hollow fiber, the better the dialysis and ultrafiltration performances. However, the lower the degree of crystallinity, the lower the mechanical strength. Accordingly, the degree of crystallinity should be in the range of from 40 to 70%. The degree of crystallinity of a regenerated cellulose hollow fiber is determined by means of X-ray diffraction. The degree of crystallining "Cr" is calculated from the following formula:

$$Cr \text{ in \%} = [(I_{002} - I_{am})/I_{002}] \times 100$$

where $I_{002}$ is the maximum intensity of diffraction from the (002) plane and $I_{am}$ is the intensity at $2\theta = 16°$.

The regenerated cellulose hollow fiber of the present invention is characterized as possessing the following crystal structure. That is, first, the degree of crystallit orientation of the cellulose II crystal structure is in the range of from 78 to 90% and, secondly, the crystallit size as measured along the fiber axis is in the range of from 60 to 150 angstroms.

Both the degree of crystallite orientation and the crystallite size are determined by X-ray diffractometry on dry hollow fiber specimens. The degree of crystallite orientation is determined by measuring the diffraction intensity distribution of the (002) plane in its azimuthal direction, which intensity distribution is the most intense reflection on the equator. The half maximum width "H" is determined from the diffraction pattern. The degree of crystallite orientation "$\pi$" is calculated from the following formula.

$$\pi \text{ in \%} = [(180 - H)/180] \times 100$$

The crystallite size is determined by measuring the diffraction intensity distribution of (040) plane, i.e., the reflection on the meridian. At the angle of 72.6° between the monochromatic X-ray (CuK) and the fiber axis, diffraction intensities occurring at $2\theta$ = about 30° to 40° are observed. The crystallite size "D" is calculated from the following formula.

$$D = (0.9 \times \lambda)/\beta \cos \theta$$

where $\lambda$ is wave length of incident X-ray, $\theta$ reflection angle and $\beta$ corrected half maximum width.

The degree of crystallite orientation of the regenerated cellulose hollow fiber can be controlled by suitably selecting the spin drafting and drawing condiditons in the course of manufacturing the cellulose ester hollow fiber, conditions of hydrolysis, and the drying conditions of the hydrolyzed hollow fiber. It is to be noted that, although the cellulose ester hollow fiber exhibits a low crystallinity, the drawing thereof greatly influences the degree of crystallite orientation of the regenerated cellulose hollow fiber. The degree of crystallite orientation of the regenerated cellulose hollow fiber of the invention should be at least 78% for the desired mechanical strength and the satisfactory Young's modulus (i.e., the wet strength/wet elongation ratio of from 1.50 to 8.0 g/d). The maximum permissible degree of crystallite orientation is approximately 90%. It is generally difficult to prepare a regenerated cellulose hollow fiber with a degree of crystallite orientation exceeding about 90%. Even if the hollow fiber has such a high degree of crystallite orientation, the hollow fiber is poor in the water permeability.

The crystallite size of the hollow fiber of the invention is in the range of from 60 to 150 angstroms, preferably from 80 to 150 angstroms. When the crystallite size is less than 60 angstroms, the mechanical strength is low. The hollow fiber having the crystallite size exceeding 150 angstroms is generally difficult to prepare.

Figure 1B:
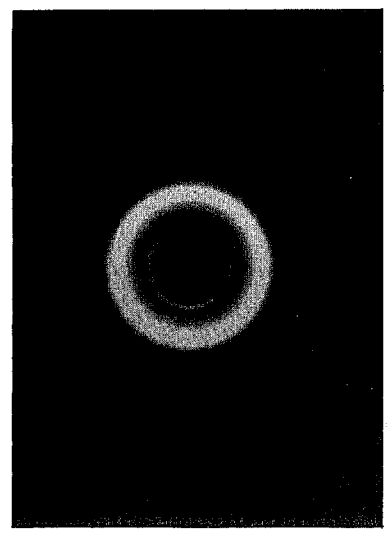
FIG. 1B is an X-ray diffraction photograph of a commercially available regenerated cellulose hollow fiber ("Cordius" supplied by Cordis Dow Corp.)

The crystallite state of one example of the hollow fibers of the invention is shown in the X-ray diffraction photograph of FIG. 1A. The degree of crystallite orientation of this hollow fiber is 81.6%. The crystallite orientation state of a commercially available regenerated cellulose fiber supplied by Cordis Dow Corp., which is presumed to be prepared by hydrolysis of a cellulose ester hollow fiber, is shown in FIG. 1B for a comparison purpose. The degree of crystallite orientation of this hollow fiber is too low to determine.

Figure 2:
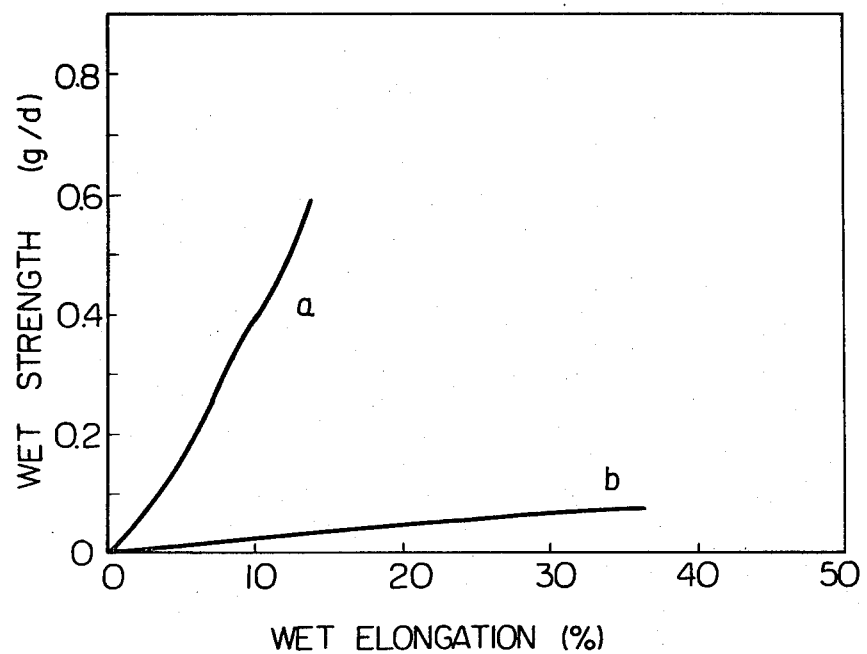
FIG. 2 illustrates tensile strength-elongation curves of wet regenerated cellulose hollow fibers, wherein curves a and b correspond to the hollow fiber of the invention and the hollow fiber supplied by Cordis Dow Corp., respectively.

The tensile strength-elongation curve of one example of the wet hollow fibers of the invention is shown as curve in FIG. 2. This hollow fiber exhibits an enhanced tensile strength and thus, a wet tensile strength wet elongation ratio of 4.4 g/d and a Young's modulus of 1.92 g/denier. In contrast, the commercially available hollow fiber (curve b) exhibits a wet tensile strength-wet elongation ratio of 0.25 g/d and a Young's modulus of 0.34 g/denier.

The regenerated cellulose hollow fiber of the present invention is produced from cellulose ester by neither dry spinning nor melt spinning procedures, but by a wet or dry-wet spinning procedure, which will be illustrated in detail as follows.

The dope for the wet spinning is prepared by dissolving cellulose ester in a non-volatile solvent. The cellulose ester used includes, for example, cellulose acetate, cellulose propionate, cellulose butyrate and cellulose mixed esters such as cellulose acetate butyrate. Of these, cellulose acetate, particularly cellulose diacetate, is preferable. The concentration of the cellulose ester in the non-volatile solvent may be varied within the range of from 15 to 30% by weight based on the weight of the dope.

The non-volatile solvent used is preferably soluble in water and has a boiling point of at least 100° C. Preferable non-volatile solvents include, for example, dioxane, dimethylacetamide, dimethylformamide, dimethylsulfoxide and acetic acid. In general, a non-volatile solvent having a high boiling point is advantageous in that, even when the dope is spun by a dry-wet spinning procedure wherein the dope is extruded into an air or inert gas atmosphere and, immediately after travelling over a certain length in the atmosphere and introduced into a coagulating liquid, the extrudate is not liable to become an asymmetrical structure in its cross-section due to evaporation of the solvent.

The dope may contain suitable amounts of additives, such as a swelling agent and a coagulation controlling agent. By the incorporation of these additives in the dope, the membrane structure of the resulting hollow fiber can be modified. Particularly, the incorporation in the dope of a metallic salt, which is soluble in the non-volatile solvent used, is preferable in that the resulting hollow fiber has a uniform porous membrane structure free from macrovoids. It is presumed that the cellulose ester is dissolved in a different state in the solvent by the incorporation of a metallic salt, and thus, when the extrudate is coagulated, the cellulose ester takes a different coagulating behavior.

The metallic salts which may be incorporated in the dope include metallic salts of inorganic or organic acids; for example, halides, perchlorates, chlorates, thiocyanates, nitrates, sulfates and phosphates, of alkali metals, alkaline earth metals, zinc, iron and copper. These metallic compounds may be used alone or in combination. Of these metallic compounds preferable are sodium, potassium and magnesium perchlorates, lithium chloride, sodium and potassium thiocyanate, sodium sulfate, sodium phosphate zinc chloride, zinc bromide and iron chloride. The amount of the metallic salt may usually be varied within the range of from 0.2 to 15% by weight based on the weight of the dope. When the amount of the metallic salt exceeds 15% by weight, it usually becomes difficult to dissolve the total weight of the metallic salt in the non-volatile solvent, or, even when the total weight of the metallic compound can be dissolved in the solvent, the dope changes in its viscosity with time and thus, is difficult to spin stably. The minimum amount of the metallic compound for achieving the above-mentioned desired effect is 0.2% by weight.

A minor amount of a nonsolvent for the cellulose ester, such as water, may be incorporated in the dope in order to control the viscosity of the dope. The amount of the nonsolvent incorporated is preferably less than about 10% by weight based on the weight of the dope.

The cellulose ester dope is extruded through a circular slit defined between inner and outer tubes of a spinning nozzle having a double tube structure, while a core liquid is forced through the inner tube of said nozzle. The double tube type spinning nozzle used may be conventional.

The cellulose ester dope may be extruded either by a wet spinning procedure, i.e., directly into a coagulating bath, or by a dry-wet spinning procedure, i.e., into an air or inert gas atmosphere followed by being introduced into a coagulating bath. However, the dry-wet spinning procedure is preferable because the dope can be extruded at a higher spinning draft ratio and in a broader spinning draft ratio range than those in the wet spinning procedure. Thus, in the dry-wet spinning procedure, the diameter of the hollow fiber can be voluntarily controlled and a spinning nozzle of a large size, processing and maintenance of which nozzle are easy, can be employed.

The core liquid to be forced through the inner tube of the spinning nozzle is not particularly limited, but should preferably be substantially insoluble in water, i.e., insoluble or slightly soluble in water. When the dope is extruded at a high draft ratio by the dry-wet spinning procedure, the core liquid should preferably be incapable of coagulating the dope or capable of only slightly coagulating the dope. Preferable core liquids include, for example, fatty acid esters, higher alcohols and hydrocarbons. By forcing the water-insoluble or slightly soluble core liquid through the inner tube of the nozzle, the hollow fibrous extrudate can be subjected to coagulating, drawing, hydrolysis, washing and drying as it is in the state of having the core liquid within the hollow, and, when the hollow fibrous extrudate is flexed in these steps, it does not become flattened. Particularly, when the hollow fibrous extrudate having the core liquid therein is shrunk due to weight loss by hydrolysis, it can maintain its roundness. Thus, the resulting hollow fiber possesses a completely circular cross-section and a uniform wall thickness and exhibits a good selective permeability.

In the dry-wet spinning process, the extrudate travels in an air or inert gas atmosphere such as nitrogen over a certain length. This length may be varied particularly depending upon the travelling speed and usually will be in the range of from 3 to 50 centimeters.

The coagulating bath may be preferably comprised of water and a nonvolatile solvent which is the same as that used for the preparation of the spinning dope. The proportion of the non-volatile solvent to water may preferably be in the range of from 60/40 to 5/95 by weight. The temperature of the coagulating bath and the residence time therein are preferably in the range of from 0° to 40° C. and in the range of from 0.1 to 5 seconds, respectively.

The coagulated cellulose ester hollow fiber is drawn in water or steam whereby the crystallite size and the degree of crystallite orientation are enhanced. The enhanced crystallite size and degree of crystallite orientation can be maintained in the final regenerated cellulose hollow fiber. Thus, the final regenerated cellulose hollow fiber exhibits satisfactory mechanical strength, uniformity in dimensions and dimensional stability. When the drawing is carried out in water, it is preferable to maintain the water at a temperature of from 10° to 90° C. At a temperature of lower than 10° C., the drawing cannot be efficiently carried out. In contrast, at a temperature exceeding 90° C., the drawing is not effected uniformly. When the drawing is carried out in steam, it is preferable to maintain the steam at a temperature of from 50° C. to 160° C. At a temperature of lower than 50° C., the drawing is not effected uniformly and, even if the drawn hollow fiber is then subjected to a heat-set treatment, the crystallite size and the degree of crystallite orientation cannot be enhanced to the desired extent. In contrast, at a temperature of higher than 160° C., the hollow fiber becomes undesirably densified.

The drawing ratio is in the range of from 1.05/1 to 2.0/1, preferably from 1.1/1 to 1.5/1. When the drawing ratio is less than 1.05, the degree of crystallite orientation is less than 78% and thus, the mechanical strengths and the dimensional stability are not enhanced to the desired extent. In contrast, when the drawing ratio exceeds 2.0, the wet strength/wet elongation ratio exceeds 8.0 g/d and thus the selective permeability and the ultrafiltration capability considerably decrease, and furthermore, pinholes are caused to occur in the membrane. The drawing may be carried out in one or more stages.

The drawn cellulose ester hollow fiber may be heat-treated in water or steam maintained at a temperature equal to or higher than the temperature at which the drawing has been carried out, whereby the degree of crystallinity and the degree of crystallite orientation are enhanced. The heat-treatment is usually carried out under conditions such that the hollow fiber is maintained substantially at a constant length. The maximum permissible temperature of the heat-treatment is usuably in the range of from 50° to 200° C.

The cellulose ester hollow fiber is then treated with an aqueous caustic alkali solution as the hollow fiber is still in the state of containing the core liquid in the hollow, whereby the cellulose ester is hydrolyzed into cellulose. As the caustic alkali, sodium hydroxide and/or potassium hydroxide are conveniently used. The concentration of the caustic alkali in the aqueous solution may be usually in the range of from 0.1 to 10% by weight based on the weight of the solution. The temperature of the aqueous caustic alkali solution may be usually in the range of from room temperature to 90° C. The time period of treating the hollow fiber with the aqueous caustic alkali solution varies mainly depending upon the particular temperature and may be approximately 10 seconds or more.

The aqueous caustic alkali solution used in the process of the invention contains, in addition to caustic alkali, at least 0.5% by weight, based on the weight of the aqueous solution, of a water-soluble metal salt. The hollow fiber considerably decreases in weight due to hydrolysis, which weight loss sometimes reaches approximately 40%, and also considerably decreases in volume. If the aqueous caustic alkali solution contains little or not water-soluble metal salt, the large volume decrease occurs and the membrane is undesirably densified so that the water permeability decreases to a great extent and the hollow fiber is poor in dimensional stability and possesses a non-uniform wall thickness. There is no particular upper limit in the concentration of the water-soluble metal salt in the aqueous solution, and the concentration may be raised up to the saturation point.

Preferable water salts used are alkali metal salts of sulfuric acid, nitric acid, phosphoric acid, oxalic acid, citric acid, acetic acid, tartaric acid and hydrochloric acid. More preferably, the alkali metal ingredient of these salts is the same as the alkali metal ingredient of the caustic alkali in the aqueous solution.

In addition to the water soluble metal salt, a minor amount of methanol or ethanol may be incorporated in the aqueous caustic alkali solution in order to accelerate the hydrolysis reaction.

After the hydrolyzing treatment, the regenerated cellulose hollow fiber may be washed with water and then dried, both in a conventional manner. It is preferable, however, that the washed regenerated cellulose hollow fiber is, while being still in a wet state, treated with a plasticizing or wetting agent such as an aqueous glycerin solution, and then, the wet hollow fiber is drawn in a gaseous atmosphere and, concurrently with or after the drawing, dried.

It is preferable that the concentration of glycerin in the aqueous solution used for plasticizing or wetting the regenerated cellulose hollow fiber is in the range of from 1 to 40% by weight, more preferably in the range of from 5 to 30% by weight, and the content of glycerin in the final dried regenerated cellulose hollow fiber is less than 10% by weight. When the final dried regenerated cellulose hollow fiber contains little or no glycerin therein, the hollow fiber cannot maintain its dialysis performances. In contrast, when the final dried regenerated cellulose hollow fiber contains an excessive amount of glycerin, the hollow fiber elongates in the fiber axis direction to an undesirable extent when it is wetted upon the use in dialysis. Such undesirable elongation of the hollow fiber causes bending of the hollow fiber in a dialyzer, leading to channeling of a dialyzate solution or reduction in the dialyzing or ultrafiltration rates of the dialyzer.

The wet regenerated cellulose fiber may be drawn in a gaseous atmosphere such as air or nitrogen. The percent of drawing is usually in the range of from 0.1 to 20%, more preferably from 1 to 10%.

The drawn and dried regenerated cellulose hollow fiber is cut into suitable lengths, and then, washed with a suitable liquid such as ethanol thereby to remove the core liquid therefrom, and finally dried. The dried regenerated cellulose fiber usually exhibits an elongation of less than 2% when immersed in water.

By suitably controlling the hydrolysis conditions and the crystal structure of the cellulose ester hollow fiber in the process of the invention, the water permeability of the membrane can be varied in the range of from 1.0 to 10 ml/m² hr mmHg. Thus, the dialysis performances for relatively low and middle molecular weight substances can be desirably varied.

The invention will be further illustrated by the following examples and comparative examples wherein parts and percents are by weight, unless otherwise specified.

EXAMPLES 1 THROUGH 4 AND COMPARATIVE EXAMPLE 1

25 parts of cellulose acetate containing 55% of combined acetic acid, 64 parts of dimethylacetamide, 5 parts of water and 6 parts of zinc chloride were stirred together at a temperature of 110° C. to form a solution. The solution was filtered and, then, deaerated to obtain a spinning dope. The spinning dope was maintained at a temperature of 45° C. and extruded at a constant rate of 4.3 ml/min through a circular slit between inner and outer tubes of a spinning nozzle having a double tube structure, while isopropyl myristate was forced through the inner tube of the nozzle at a constant rate of 2.7 ml/min. The inner tube had inner and outer diameters of 2 mm and 4 mm, respectively, and the outer tube had an inner diameter of 6 mm. The tubular cellulose acetate extrudate having isopropyl myristate inside the tube was allowed to travel in the air atmosphere over a length of 12 centimeters and, immediately thereafter, introduced into a coagulating bath comprised of an aqueous 30% dimethylacetamide solution and maintained at a temperature of 15° C. The residence time of the tubular extrudate in the coagulating bath was 1.5 seconds. The so coagulated tube was taken up at a speed of 30 m/min. Subsequently, the tube was drawn 1.3 times the original length in a water bath maintained at a temperature of 25° C. and, then, taken up on a reel at a speed of 39 m/min. The reeled tube was treated with water maintained at a temperature of 80° C., and then, immersed in an aqueous 3% sodium hydroxide solution maintained at a temperature of 50° C., for a period of one hour, whereby the cellulose acetate was hydrolyzed. The aqueous sodium hydroxide solution contained sodium acetate at a concentration shown in Table I, below. Thereafter, the hydrolyzed product was washed with water maintained at a temperature of 70° C., immersed in an aqueous 5% glycerin solution, dried in hot air at a temperature of 70° C. and cut into a length of 40 cm, and finally, isopropyl myristate present inside the tube was removed.

The so prepared hollow fiber exhibited a good transparency. The electron microscopic observation thereof showed that the hollow fiber had no macrovoid in the cross-section, and the cross-section was uniform and of a round doughnut shape having outer and inner diameters of about 290 and about 250 microns, respectively. The hollow fiber exhibited good permeability to urea and creatinine, but no permeability to albumin. Its water permeability is shown in Table I, below.

TABLE I

| Example No. | Concentration of Na acetate (%)* | Water permeability (ml/m² · hr · mmHg) |
| --- | --- | --- |
| 1 | 2 | 1.6 |
| 2 | 5 | 1.9 |
| 3 | 10 | 2.5 |
| 4 | 20 | 3.4 |
| Comparative 1 | 0.1 | 0.39 |

*Based on the weight of the sodium hydroxide sodium acetate solution.

X-ray diffractometry of the Example 4 hollow fiber specimen showed that it had a degree of 63%, a degree of crystallite orientation of 81.6% and a crystallite size, i.e., a crystallite length in the direction along the fiber axis, of 112 angstroms, an X-ray diffraction photograph of which is shown in FIG. 1A. The wet strength of the specimen and the wet elongation thereof were 0.59 g/d and 13.5%, respectively, and thus, the wet strength to wet elongation ratio was 4.4 g/d. The wet strength to wet elongation ratio curve is shown as "a" in FIG. 2.

EXAMPLE 5

A spinning dope was prepared in a manner similar to that described in Example 1, which dope was comprised of 26% of cellulose acetate containing 55% of combined acetic acid, 70% of dimethylacetamide and 4% of water, using this spinning dope, a hollow fiber was prepared in a manner similar to that employed in Example 4. The resultant hollow fiber exhibited a good roundness and the following characteristics.

Size:
- inner diameter = 250 microns,
- outer diameter = 300 microns,

Degree of crystallinity, degree of crystallite orientation and crystallite size:
64%, 81% and 110 angstroms, respectively. Wet strength, wet elongation and wet strength to wet elongation ratio:
0.54 g/d, 13% and 4.1 g/d, respectively, Water permeability: 2.5 ml/m².hr.mmHg Urea permeability constant: $2.7 \times 10^{-2}$ cm/min.

EXAMPLES 6 THROUGH 9

23 parts of cellulose acetate containing 53.5% of combined acetic acid, 71 parts of dimethylformamide, 2 parts of water and 4 parts of an inorganic metal salt shown in Table II, below, were stirred together at a temperature of 100° C. to form a solution. The solution was filtered and then deaerated to obtain a spinning dope. The spinning dope was maintained at a temperature of 50° C. and extruded at a constant rate of 4.9 ml/min through a circular slit of a spinning nozzle similar to that used in Example 1, while decalin was forced through the inner tuble of the nozzle at a constant rate of 3.1 ml/min. The tubular extrudate was allowed to travel in a nitrogen atmosphere over a length of 15 centimeters and, immediately thereafter, introduced into a coagulating bath comprised of an aqueous 20% dimethylformamide solution and maintained at a temperature of 20° C. The residence time of the extrudate in the coagulating bath was 1.5 seconds. The so coagulated tube was taken up at a speed of 30 m/min. Subsequently, the tube was drawn at various drawing ratios shown in Table II, below, in a water bath maintained at a temperature of 50° C., and each drawn tube was taken up on a reel. Each reeled tube was treated with water at a temperature of 70° C., and then, immersed in an aqueous solution containing 2% of sodium hydroxide and 15% of sodium sulfate maintained at room temperature, for a period of 3 hours, whereby the cellulose acetate was hydrolyzed. The hydrolyzed product was washed with water at a temperature of 70° C., immersed in an aqueous 2% glycerin solution, dried in hot air at a temperature of 70° C. and cut into a length of 50 cm, and finally, decalin present inside the tube was removed.

All of the so prepared hollow fibers were transparent. The electron microscopic observation thereof showed that the follow fibers had no macrovoid in the cross-sections, and were uniform and of a round doughnut shape. The hollow fibers exhibited good permeability to urea and cretinine but no permeability to albumin. The hollow fibers exhibited the water permeabilities and other physical properties shown in Table II, below, which are satisfactory as ultrafiltration hollow fibers.

TABLE II

| Example No. | Inorganic metal salt incorporated in spinning dope | Drawing ratio | Degree of crystallinity (%) | Degree of crystallite orientation (%) | Crystallite size (angstroms) | Wet strength (g/d) | Wet elongation (%) | Wet strength/ wet elongation ratio (g/d) | Water Permeability (ml/hr · m² · mmHg) |
| --- | --- | --- | --- | --- | --- | --- | --- | --- | --- |
| 6 | Ferric chloride | 1.5 | 66.0 | 83.1 | 115 | 0.70 | 13.0 | 5.4 | 2.8 |
| 7 | Sodium thiocyanate | 1.3 | 64.5 | 82.5 | 113 | 0.61 | 14.5 | 4.2 | 3.0 |
| 8 | Calcium nitrate | 1.2 | 63.5 | 80.5 | 110 | 0.50 | 15.8 | 3.2 | 4.0 |
| 9 | Magnesium perchlorate | 1.1 | 63.0 | 78.5 | 110 | 0.45 | 17.2 | 2.6 | 5.5 |

EXAMPLE 10

24 parts of cellulose acetate containing 55% of combined acetic acid, 66 parts of dimethylacetamide and 10 parts of sodium thiocyanate were stirred together at a temperature of 85° C. to form a solution. The solution was filtered and, then, deaerated to obtain a spinning dope. The spinning dope was maintained at a temperature of 50° C. and extruded at a constant rate of 5.3 ml/min through a circular slit of a spinning nozzle similar to that used in Example 1, while isopropyl myristate was forced through the inner tube of the nozzle at a constant rate of 3.0 ml/min. The tubular extrudate was allowed to travel in the air atmosphere over a length of 15 centimeters and, immediately thereafter, introduced into a coagulating bath comprised of an aqueous 30% dimethylacetamide solution, thereby to be coagulated. The so coagulated tube was taken up at a speed of 30 m/min. Subsequently, the tube was drawn 1.1 times the original length in a water bath maintained at a temperature of 75° C. and, then, taken up on a reel at a speed of 33 m/min. The tube was, while being continuously reeled off from the reel, immersed in an aqueous solution containing 5% of sodium hydroxide and 15% of sodium acetate maintained at a temperature of 80° C., for a period of 22 seconds, whereby the cellulose acetate was hydrolyzed. The hydrolyzed product was continuously washed with water, immersed in an aqueous 15% glycerin solution and, then, dried in a tunnel dryer maintained at a temperature of 130° C., while the hydrolyzed product was drawn 1.5% its original length.

The so prepared hollow fiber had no macrovoid in the cross-section and was uniform and round in the cross-section. The hollow fiber was satisfactory in handling characteristics and dimensional stability, and exhibited good permeability to urea and creatinine, but no permeability to albumin. The hollow fiber exhibited the following characteristics.

Size:
  inner diameter = 300 microns,
outer diameter = 340 microns,
Degree of crystallinity, degree of crystallite orientation and crystallite size:
65%, 79% and 95 angstroms, respectively, Wet strength, wet elongation and wet strength to wet elongation ratio:
0.51 g/d, 17.5% and 2.9 g/d, respectively,
Water permeability: 3.1 ml/m².hr.mmHg A plurality of the hollow fibers were, after being washed with ethanol, constructed into a module. When the hollow fibers of the module were reinstated to a wet state, the hollow fibers exhibited an elongation of 1.5%. Thus, no channeling of the dialyzate solution occurred.

EXAMPLES 11 AND 12

24 parts of cellulose acetate containing 55% of combined acetic acid, 71 parts of dimethylsulfoxide and 5 parts of sodium thiocyanate were stirred together at a temperature of 90° C. to form a solution. The solution was filtered and, then, deaerated to obtain a spinning dope. The spinning dope was extruded at a constant rate of 1.5 ml/min through a circular slit of a spinning nozzle similar to that used in Example 1, while a core liquid shown in Table III, below, was forced through the inner tube of the nozzle at a constant rate of 0.9 ml/min. The tubular extrudate was allowed to travel in the air atmosphere over a length of 8 cm and, immediately thereafter, introduced into a coagulating bath comprised of an aqueous 15% dimethylsulfoxide solution, thereby to be coagulated. The residence time of the extrudate in the coagulating bath was 2.0 seconds. The so coagulated tube was taken up at a speed of 10 m/min. Subsequently, the tube was drawn 1.3 times the original length in a water bath maintained at a temperature of 40° C. and, then, taken up on a reel at a speed of 13 m/min. The tube was, while being continuously reeled off from the reel, immersed in an aqueous solution containing 3% of sodium hydroxide and 10% of sodium chloride maintained at a temperature of 60° C., for a period of one minute, whereby the cellulose acetate was hydrolyzed. The hydrolyzed product was washed with boiling water and again taken up on a reel. Then, the obtained hollow fiber was treated with an aqueous 5% glycerin solution and, then, while being reeled off from the reel, dried at a temperature of 80° C.

The obtained hollow fiber was transparent, and the electron microscopic observation thereof showed that the hollow fiber had no macrovoid in the cross-section. The hollow fiber exhibited good permeability to urea and creatinine, but no permeability to albumin. Other physical properties of the hollow fiber are shown in Table III, below.

TABLE III

| Example No. | Core liquid | Inner diameter (microns) | Outer diameters (microns) | Degree of crystallinity (%) | Degree of crystallite orientation (%) | Crystallite size (angstroms) | Wet strength (g/d) | Wet elongation (%) | Wet strength/ wet elongation ratio (g/d) | Water permeability (ml/hr · m² · mmHg) |
| --- | --- | --- | --- | --- | --- | --- | --- | --- | --- | --- |
| 11 | Octyl acetate | 250 | 280 | 64.0 | 80 | 105 | 0.52 | 13.1 | 3.97 | 3.1 |
| 12 | Octanol | 238 | 280 | 64.5 | 80 | 105 | 0.51 | 13.5 | 3.78 | 3.1 |

EXAMPLE 13

25 parts of cellulose acetate containing 55% of combined acetic acid, 64 parts of dimethylacetamide, 6 parts of zinc chloride and 5 parts of water were stirred together at a temperature of 85° C., for one hour, to form a solution. The solution was filtered and, then, deaerated to obtain a spinning dope. The spinning dope was extruded at a temperature of 55° C. through a circular slit of a spinning nozzle similar to that used in Example 1, while isopropyl myristate was forced through the inner tube of the nozzle. The tubular extrudate was allowed to travel in the air atmosphere over a length of 15 cm and, immediately thereafter, introduced into a coagulating bath comprised of an aqueous 30% dimethylacetamide solution having incorporated therein a minor amount of zinc chloride and maintained at a temperature of 21° C., thereby to be coagulated. The coagulated tube was subsequently drawn 1.3 times the original length in a water bath maintained at a temperature of 20° C. and, then, taken up on a reel at a speed of 42 m/min. The tube was continuously immersed in an aqueous solution containing 3% of sodium hydroxide and 10% of sodium acetate maintained at a temperature of 90° C., whereby the cellulose acetate was hydrolyzed. The hydrolyzed product was washed with boiling water, passed through an aqueous glycerin bath and, then, dried in hot air under tension.

The obtained hollow fiber had an inner diameter of 260 microns and a thickness of 20 microns. X-ray diffractometry of the hollow fiber showed that it had a degree of crystallinity of 63%, a degree of crystallite orientation of 82% and a crystallite size, in the direction along the fiber axis, of 120 angstroms. The hollow fiber exhibited a wet strength of 0.43 g/d, a wet elongation of 10%, a wet strength to wet elongation ratio of 4.3 g/d and a Young modulus of 3.7 g/d, and thus, was satisfactory in handling characteristics. Its water permeability and urea permeability were 2.86 ml/hr. m$^2$. mmHg and $2.8 \times 10^{-2}$ cm/min, respectively.

EXAMPLE 14

Following the procedure mentioned in Example 13, a hollow fiber was prepared, wherein the coagulated tube was drawn 1.3 times the original length in steam, at a temperature of 110° C., instead of in a water bath maintained at a temperature of 20° C., with all other conditions remaining substantially the same. The obtained hollow fiber had an inner diameter of 260 microns and a thickness of 20 microns. X-ray diffractometry of the hollow fiber showed that it had a degree of crystallinity of 68, a degree of crystallite orientation of 83% and a crystallite size in the direction along the fiber axis, of 140 angstroms. The hollow fiber exhibited a wet strength of 0.51 g/d, a wet elongation of 11% and a wet strength to wet elongation ratio of 4.6 g/d, and thus, was satisfactory in handling characteristics. Its water permeability was 2.90 ml/hr. m$^2$. mmHg and the dialysis performances were satisfactory.

What we claim is:

1. A process for producing a membrane substantially consisting of cellulose in the form of a hollow fiber, which comprises the step of:
   extruding a dope comprised of cellulose ester in a nonvolatile organic solvent having a boiling point of at least 100° C. through a circular slit defined between inner and outer tubes of a spinning nozzle having a double tube structure, while a core liquid substantially insoluble in water is forced through the inner tube of said nozzle;
   coagulating the hollow fibrous extrudate in a coagulating bath;
   drawing the coagulated hollow fibrous extrudate 1.05 to 2.00 times its original length; and then,
   treating the drawn hollow fiber still containing the core liquid in the hollow, with an aqueous caustic alkali solution containing at least 0.5% by weight of a water-soluble metal salt, thereby hydrolyzing the cellulose ester into cellulose.

2. A process according to claim 1 wherein said dope to be extruded contains 0.2 to 15% by weight, based on the weight of the dope, of a metallic salt soluble in the non-volatile solvent used.

3. A process according to claim 2 wherein said metallic salts is at least one compound selected from the group consisting of halides, perchlorates, chlorates, thiocyanates, nitrates, sulfates and phosphates, of alkali metals, alkaline earth metals, zinc, iron and copper.

4. A process according to claim 1 or 2 wherein said non-volatile organic solvent is soluble in water.

5. A process according to claim 1 or 2 wherein said dope is extruded into an air or inert gas atmosphere and, immediately after the hollow fibrous extrudate travels over a certain length therein, introduced into the coagulating bath.

6. A process according to claim 1 or 2 wherein the coagulated hollow fibrous extrudate is drawn in water at a temperature of from 10° to 90° C. or in steam at a temperature of from 50° to 160° C.

7. A process according to claim 1 or 2 wherein said aqueous caustic alkali solution contains 0.1 to 10% by weight, based on the weight of the solution, of a caustic alkali, and maintained at a temperature of not higher than 90° C.

8. A process according to claim 1 or 2 wherein the metallic ingredient of the water soluble metal salt is the same alkali metal as the alkali metal ingredient of the caustic alkali in the aqueous caustic alkali solution.

9. A process according to claim 1 or 2 which further comprises the steps of:
   treating the hydrolyzed hollow fiber, while being still in a wet state, with an aqueous glycerin solution thereby to be plasticized,
   drawing the wet hollow fiber in a gaseous atmosphere, and,
   concurrently with or after said drawing, drying the wet hollow fiber.

10. The process of claim 1 wherein said aqueous caustic alkali solution contains at least 2% of said water-soluble metal salt.

11. The process of claim 1 wherein said aqueous caustic alkali solution contains between 2 and 20% of said water-soluble metal salt.

12. The process of claim 1 wherein said water-soluble metal salt is selected from the group consisting of alkali metal salts of sulfuric acid, nitric acid, phosphoric acid, oxalic acid, citric acid, acetic acid, tartaric acid and hydrochloric acid.

* * * * *